United States Patent [19]

Spruce et al.

[11] Patent Number: 4,924,587

[45] Date of Patent: May 15, 1990

[54] SERVICES CONNECTIONS FOR WORKSTATIONS

[75] Inventors: Brian Spruce, Worsley; David P. Welsby; John L. Bell, both of Astley, all of United Kingdom

[73] Assignee: British Nuclear Fuels Plc, Warrington, England

[21] Appl. No.: 258,720

[22] Filed: Oct. 17, 1988

[30] Foreign Application Priority Data

Oct. 26, 1987 [GB] United Kingdom ................. 8725032

[51] Int. Cl.[5] ................................................ B23P 19/00

[52] U.S. Cl. .......................................... 29/723; 29/764

[58] Field of Search ................. 29/723, 758, 764, 759, 29/251, 825; 285/345, 371, 369; 137/315, 277; 376/262

[56] References Cited

U.S. PATENT DOCUMENTS

| | | | |
|---|---|---|---|
| 3,538,585 | 11/1970 | Hendry et al. | 29/764 |
| 4,439,905 | 4/1984 | Gourdon et al. | 29/723 X |
| 4,571,820 | 2/1986 | Matsumoto et al. | 29/723 |
| 4,667,400 | 5/1987 | Ui et al. | 29/764 X |

FOREIGN PATENT DOCUMENTS

| | | | |
|---|---|---|---|
| 768456 | 10/1980 | U.S.S.R. | 29/723 |
| 1412461 | of 1975 | United Kingdom . | |
| 1416466 | of 1975 | United Kingdom . | |
| 1430186 | 3/1976 | United Kingdom . | |
| 2012124 | 7/1979 | United Kingdom . | |
| 1571792 | 7/1980 | United Kingdom . | |
| 2125919 | 3/1984 | United Kingdom . | |
| 2139432 | 4/1984 | United Kingdom . | |

*Primary Examiner*—William Briggs
*Attorney, Agent, or Firm*—William R. Hinds

[57] ABSTRACT

A workstation within a containment cell is provided with a services-supply module or unit by means of which a range of services such as electrical power, hydraulics, pneumatics etc. are made available for in-cell use. The services are provided by means of a number of replaceable and exchangeable services-connection cartridges which sealingly engage in the unit and provide continuity between out-of-cell supply lines connectible to adaptors and in-cell supply lines connectible to adaptors. The cartridges are replaceable without breaking cell containment conditions with the aid of a tool (by which a replacement cartridge is fed forwardly to displace in nose to tail relationship the cartridge to be replaced.

5 Claims, 6 Drawing Sheets

SERVICES CONNECTIONS FOR WORKSTATIONS

This invention relates to the provision of services, such as electrical, hydraulic, penumatic and other supplies, to workstations in order to support various working operations to be carried out.

Where the workstations are situated in a controlled environment to be maintained isolated from its surroundings, the entry of services supplies into that environment needs to be sealed. Already known for this purpose are services connection assemblies comprising a cartridge having connectors at opposite ends for coupling with services supply lines, such cartridge cooperating with a unit in a throughbore of which the cartridge is disposed sealingly but slidably so as to be withdrawable from the unit on release of releasable means by which the position of the cartridge in the throughbore is normally fixed.

It may be required that one type of service can be substituted for another, hence that an exchange of cartridges can be easily carried out. For facilitating such exchange, it is known already to use a cartridge replacement means in the nature of a carrier which is attachable at opposite ends, on the one hand, to a cartridge to be replaced and, on the other hand, to the cartridge to replace it. By arranging that this carrier, from one end to the other, is of a size capable of maintaining the seal in the throughbore, it can be pushed through the throughbore so as to bring about replacement without loss of the seal. For completion of the replacement operation, detachment of the carrier, with the replaced cartridge, is then carried out but a consequence of this arrangement is that not only the replaced cartridge but also the carrier are now present in the controlled environment from which removal will be desirable.

With controlled environments within containment cells as used in the nuclear industry, any object becoming exposed to such an environment generally has to be treated as contaminated and therefore subject on removel to special precautions in handling and disposal. There is therefore an incentive to minimize the number and bulk of objects that call for removal from such an environment.

The invention is characterised by elongation of the throughbore, with constant cross sectional area, to a length sufficient for one cartridge following another, nose to tail, to be displaceable through the throughbore without loss of the seal in bringing the one cartridge into position in place of the other, and by operation of the cartridge replacement means, whilst engaged with the unit, to feed forwardly relative to itself the one cartridge which is to replace the other so as to effect displacement as aforesaid.

By means of the invention, no further objects are introduced into the controlled environment that have been already exposed thereto, that is to say, the replaced cartridge, and therefore the task of later removal of introduced objects is simplified and the overall operation of exchanging cartridges is made easier.

The invention will now be described by way of example only with reference to the accompanying drawings, in which.

The illustrated example is for a containment cell as used in the nuclear and pharmaceutical industries where the work area is in a controlled environment required to be isolated from its surroundings and work operations are carried out within that environment under manual control either via glove fittings, as in glove boxes, or via master-slave manipulators.

Specifically the cell in this instance is a shielded containment cell for the post irradiation examination of nuclear fuel materials but it is to be understood that the ambit of the invention is not restricted to this specific application.

Figure 1:
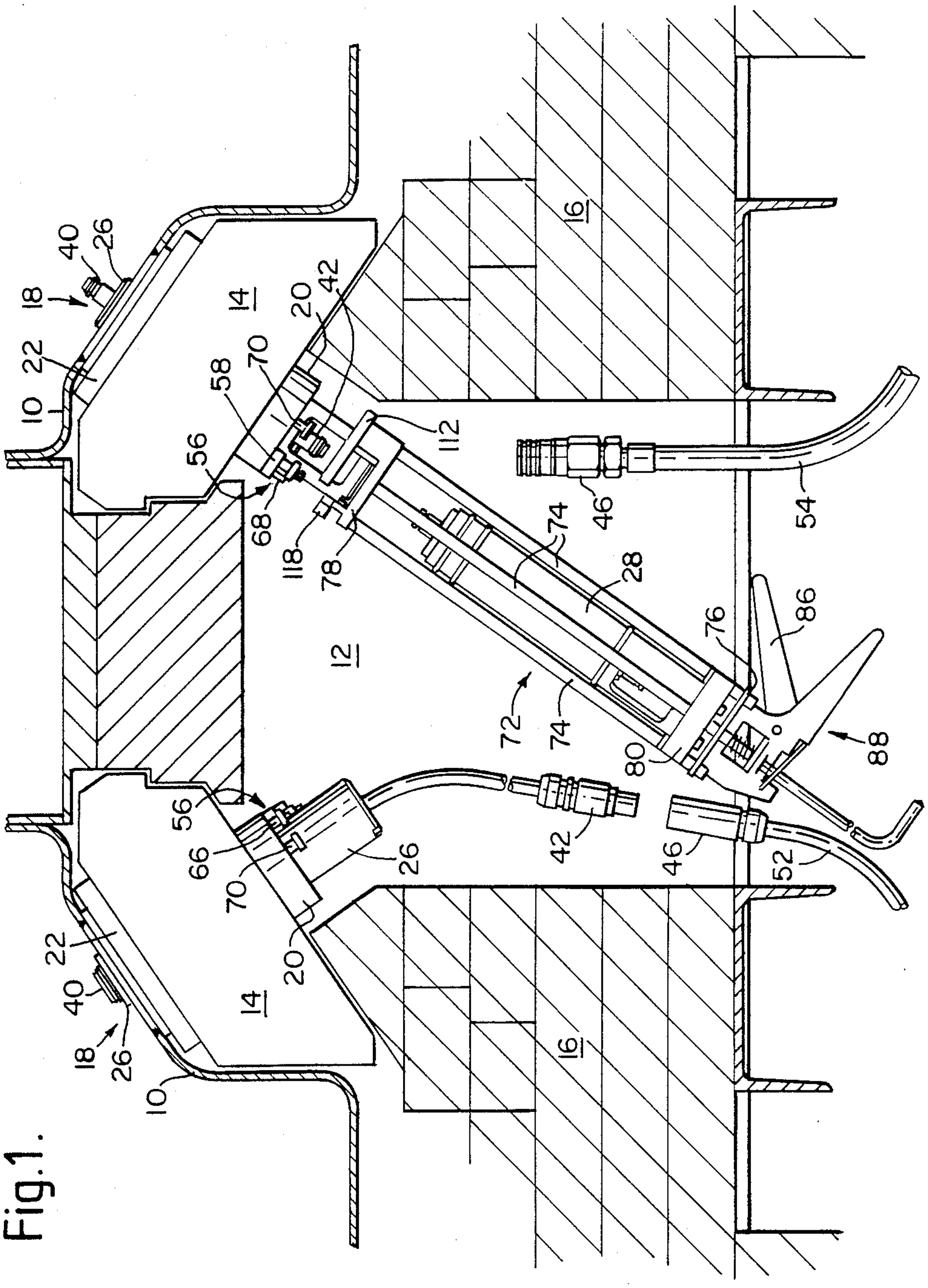
FIG. 1 is a sectional view showing part only of a containment cell and a shielded man-access tunnel beneath the cell, the view also illustrating a cartridge-changing tool in position.
Figure 2:
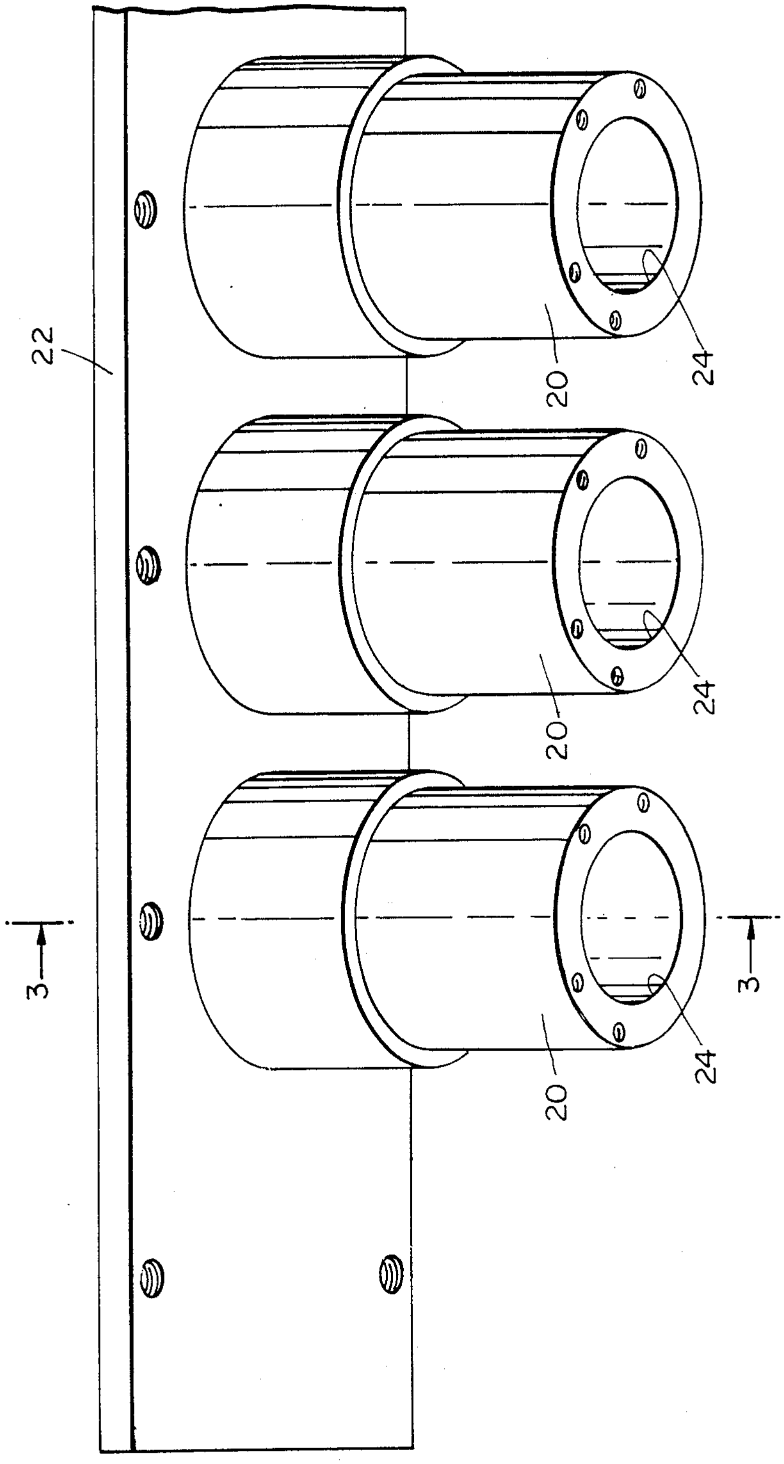
FIG. 2 is a perspective view of part of a services-supply unit for reception of services-connection cartridges (latch mechanisms omitted)
Figure 3:
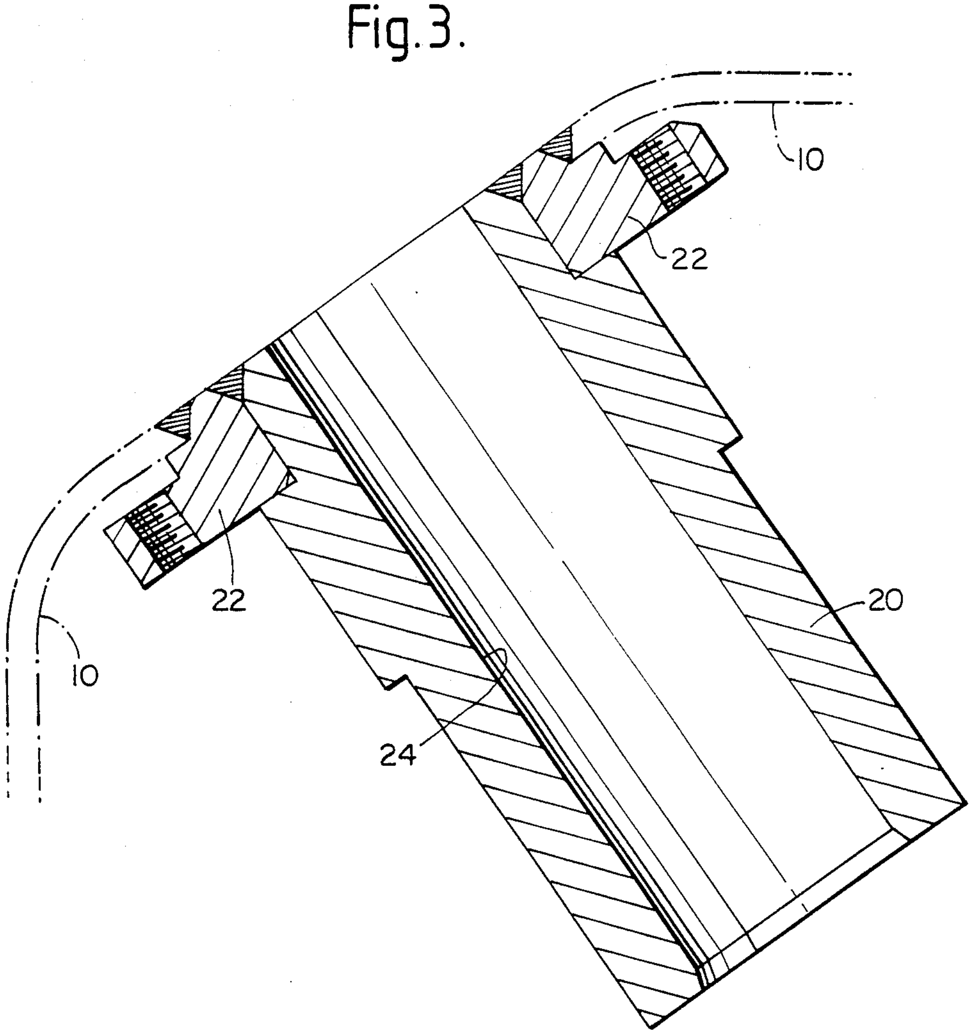
FIG. 3 is a sectional view of one of the sleeves of the manifold unit, the section being taken in the direction 3—3 in FIG. 2.

Referring now to FIGS. 1–3, the boundary of the base of a containment cell is defined by a liner 10 beneath which there is provided a man-access tunnel 12 which is shielded by blocks 14 of lead shielding and blocks 16 of steel shielding to protect personnel from exposure to radiation levels prevailing within the cell, ie above the liner 10. The tunnel houses a wide range of services supply lines, eg electrical power at different ratings, hydraulics, pneumatics, liquid supplies (eg solvents) at different pressures, vacuum supplies, instrument connections etc. The cell has a series of in-cell workstations disposed at intervals lengthwise of the tunnel and each workstation is provided with a services-supply unit 18 (two are shown in FIG. 1, one on each side of the tunnel) by means of which various services are brought into the cell, the services being selected according to the needs of each particular workstation (which needs may change from time to time).

A typical services-supply unit 18 may present twelve services connection points. As shown in FIGS. 1–3, each unit 18 comprises a number of sleeves 20 connected, as by welding for example, to a common mounting plate 22 which is itself secured to the liner so that the throughbores 24 in the sleeves open into the interior of the cell. Each throughbore 24 is elongated, with constant cross-sectional area, and serves to receive a respective services-connection cartridge 26, examples of which are shown in FIG. 1 and are shown in greater detail in FIGS. 4 and 5. It wil also be noted that the length of each throughbore is such as to exceed the maximum cross-sectional dimension.

Figure 4:
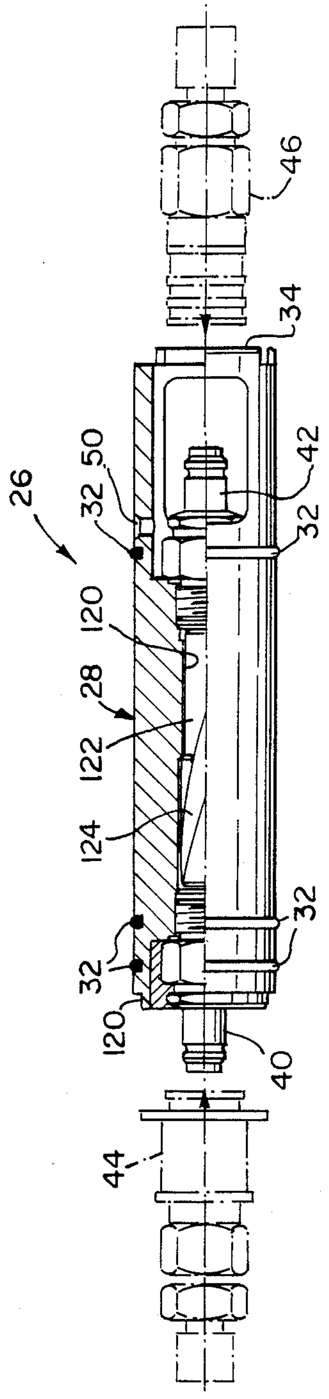
FIG. 4 is a half-sectioned side view of one form of services-connection cartridge and FIG. 4A is an end view of the cartridge.
Figure 4A:
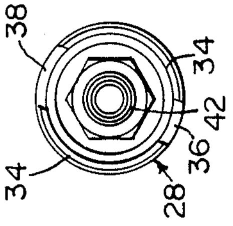
Figure 5:
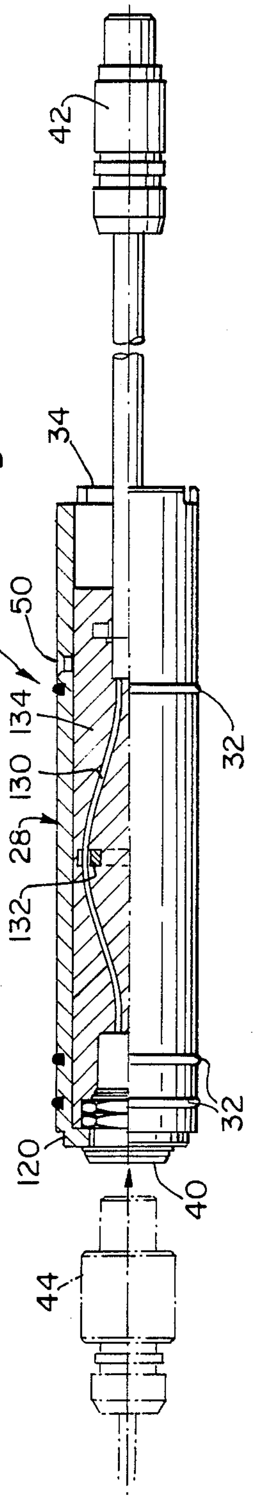
FIG. 5 is a smiliar view to that of FIG. 4 of another form of services-connection cartridge.

The cartridge 26 shown in FIGS. 4 and 4A is intended for use with a fluid supply such as compressed air or hydraulic fluid whilst that of FIG. 5 is intended for electrical power supply. A wide variety of cartridges will in general be employed according to the range of services required but, in each instance, the cartridges will have certain features in common so that any one of the different types of cartridges available can be inserted into any one of the sleeves 20 of each servcies-supply unit 18. Thus, irrespective of the particular services to be supplied, each cartridge 26 comprises a generally cylindrical body 28 of a diameter which is a close sliding fit in the throughbores 24 and each body is provided with peripheral grooves receiving 0-ring seals 32 in order to make sealing but slidable engagement with the throughbores 24 on insertion into the sleeves 20, the maximum spacing between the seals being less than the length of the throughbores.

At one end, the out-of-cell end, each body 28 is provided with an inward flange 34 which, at diametrally opposite positions around its circumference, is interrupted by slots 36, 38 (FIG. 4A) one of which is wider, in the circumferential direction, than the other. Connectors 40, 42 are associated with the in-cell and out-of-cell ends respectively of each cartridge 26 for quick-release connection with in-cell connectors 44 and out-of-cell connectors 46 (not shown in FIG. 5). Adjacent to the out-of-cell end, each cartridge is formed with a latch keeper 50 in the form of a transverse bore in the outer cylindrical wall of the body 28.

FIG. 1 illustrates cartridges 26 located in their normal operative positions relative to the units 18, ie with the connectors 40 accessible from the interior of the cell and with the connectors 42 accessible from within the man-access tunnel beneath the cell. In use, supply lines, eg cable 52/hose 54, will be conected to the out-of-cell connectors 42 and similar in-cell supply lines (not shown) will be connected to the connectors 40. The seals 32 on the cartridges make sealig contact with the walls of the throughbores 24 so that any desired conditions prevailing within the cell, eg sub-atmospheric pressure, are maintained.

When properly located, each cartridge 26 is held axially and rotatably captive in the unit 18 by a latching mechanism 56 associated with each sleeve 20. As shown in FIGS. 6, 8, 9 and 10, the latching mechanism comprises a lever 58 mounted pivotally on a pin 60 for movement, in a plane normal to the axis of the sleeve 20, between a latching position (see FIG. 8) in which a latch projection 62 extends radially inwardly of the throughbore (but at a position external to the bore in the illustrated embodiment) for engagement in the keeper hole 50 of a cartridge and a releasing position (see FIG. 10) in which the projection is retracted radially out of engagement with the cartridge. The latch lever 58 is urged to its latching position by a torsion coil spring 64 (see FIG. 6) and a stop 66 limits pivoting of the lever in the latching direction. The lever 58 also carries a cam follower 68 and each sleeve 20 is provided with a pair of diametrally-related headed pins 70 for co-operation with a cartridge-insertion tool 72.

Figure 6:
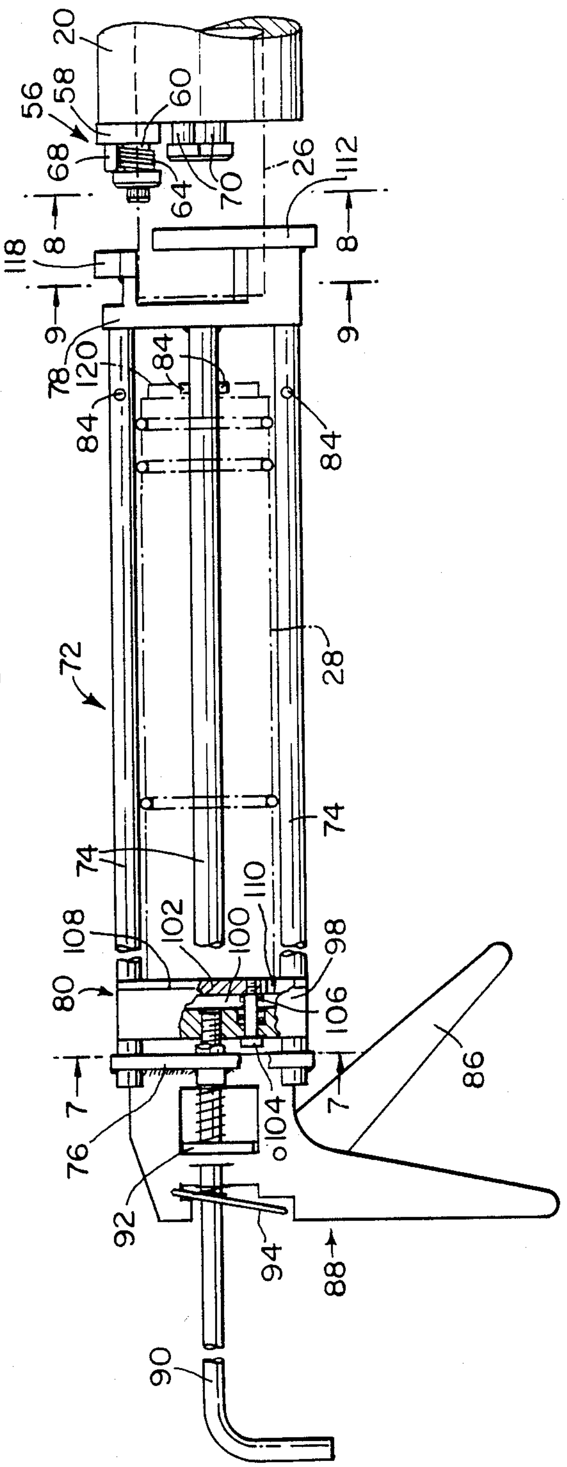
FIG. 6 is a side view, partly-sectioned, showing a cartridge-insertion tool in alignment with a cartridge-receiving sleeve of the manifold unit.

The tool 72 is provided for loading replacement cartridges into the sleeves 20 when, for instance, one or more of the service supplies to a workstation is to be changed. The tool allows replacement to be carried out without breaking the cell containment. As shown in FIG. 6, the tool comprises a cartridge-receiving section or cage defined by a number of parallel and equiangularly spaced guide rods 74 (four are shown) extending from a mounting plate 76 and terminating at a ring 78, the diameter of the ring 78 and the diametral spacing of the rods 74 being such that a cartridge can be loaded as a fairly close sliding fit into the tool via the ring opening. FIGS. 1 and 6 illustrate a cartridge 28 loaded into the tool.

The tool includes a piston member 80 formed with equiangularly-spaced, peripheral recesses 82 which register with the guide rods 74 so that the piston can travel, without rotating, along the cartridge-receiving cage between the retracted position shown in FIGS. 1 and 6 and an extended position (not shown) in which the leading face of the piston 80 abuts stops 84 (see FIG. 6) located adjacent the ring 78. Displacement of the piston 80 towards the ring 78 can be effected by any suitable means. In the illustrated embodiment, the tool 72 incorporates a jacking-type mechanism of the kind well-known for use in mastic applicator guns. Repeated operation of the trigger 86 of the handle assembly 88 serves to shift a drive shaft 90 incrementally by means of a canted plate 92 so that the piston 80, which is connected to one end of the shaft 90, is likewise displaced incrementally towards its extended position with consequent forward feeding of the cartridge 26 in a discharge direction. The jacking mechanism is purely conventional and further detailed description is therefore unnecessary except to note that, as in conventional mechanism of this type, the drive is unidirectional and the shaft 90 can only be returned towards its starting position by releasing a brake plate 94 and pulling the shaft back.

Figure 7:
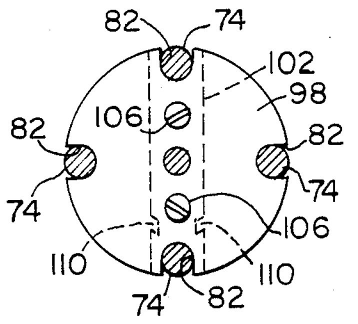
FIG. 7 is a sectional view in the direction 7—7 in FIG. 6 of the piston of the tool.
Figure 8:
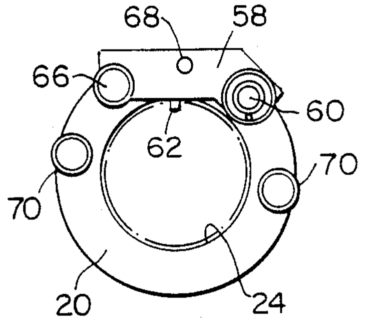
FIG. 8 is an end view in the direction 8—8 in FIG. 6.

The tool 72 differs from a conventional mastic gun in two important repects, ie the construction of the piston 80 and the ring 78. Referring to FIGS. 6 and 7, the piston 80 comprises a main body 98 formed with a diametral recess 100 accommodating a locating member 102 which is slidable axially of the piston 80 under the control of pins 104 and springs 106, the springs 106 normally biasing the locating member 102 to a projecting position as shown in FIG. 6 where it is proud of the leading face 108 of the piston. In the circumstances to be described, the locating member 102 can be depressed into the recess 100, against the biassing of the springs 106, until it is no longer proud of the leading face. The width of the member 102 corresponds to the circumferential extent of the slot 38 in the cartridge flange 34 (FIG. 4A) and is greater than that of the slot 36. However, the member 102 is formed with a pair of strategically located cut-outs 110 so that it can register with both slots 36, 38 of the cartridge when the cartridge is loaded into the tool with its out-of-cell end abutting the piston 80. The member 102 consequently serves as a means for securing a predetermined angular orientation of the cartridge with respect to the tool and, as will become apparent, with respect to the sleeve 20 in which the cartridge is to be installed.

Figure 9:
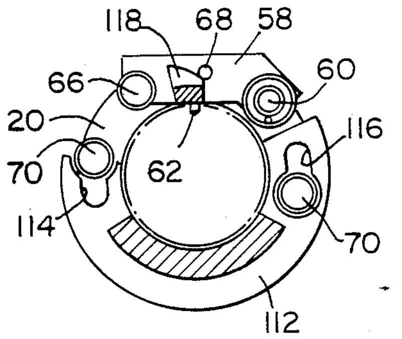
FIGS. 9 and 10 are sectional views in the direction 9—9 in FIG. 6 showing the manner in which the tool operates a latch associated with the cartridge-receiving sleeve.
Figure 10:
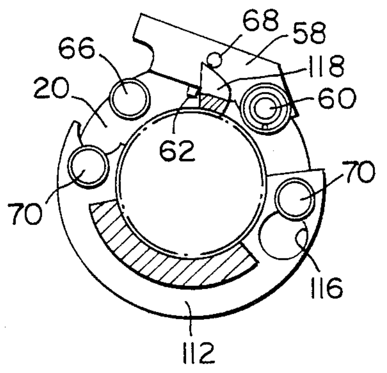

The ring 78 carries a part-annular bracket 112 whose axis of curvature generally coincides with the central axis of the cartridge-receiving cage. The bracket 112 has a pair of diametrally-opposite slots 114, 116 of generally keyhole-configuration except that the enlarged portion of slot 114 is truncated at one end of the bracket. The slots 114, 116 are arranged for registration with the headed pins 70 on the sleeves 20 in the manner of a bayonet-fitting. Thus, provided the tool 72 is offered up to the sleeve in the correct orientation, the bracket 112 can be displaced towards the out-of-cell end of the sleeve 20 so that the heads of the pins 70 pass through the enlarged portions of the slots 114, 116 (see FIG. 9) until the heads are clear of the bracket thus allowing the tool to be rotated (clockwise as seen in FIGS. 9 and 10) to trap the pins 70 within the narrower sections of the slots 114, 116 and thereby hold the tool axially captive to the sleeve. Rotation of the tool is accompanied by corresponding rotation of the cartridge by virtue of engagement of the locating member 102 in slots 36, 38.

The ring 78 also carries a cam 118 which, when the tool 72 is initially registered with the pins 70 as in FIG. 9, is brought into close proximity with the cam follower 68. As the tool is rotated to the position shown in FIG. 10, the cam 118 lifts the follower 68 and shifts the latch lever 58 to its releasing position. Thus, the action of correctly registering the tool with the sleeve automatically delatches the cartridge which currently occupies the sleeve. With the tool correctly registered, insertion of a replacement cartridge can now proceed (assuming connectors 42, 44 have been disconnected from their supply lines). This is effected by operating the handle assembly 88 to displace the piston 80 and hence to feed forwardly the replacement cartridge towards the sleeve 20. The dimensioning of the cartridges 26 relative to the tool and the sleeve may be such that, when the tool is registered with the sleeve and the replacement cartridge is fully loaded in the tool, the leading end of the replacement cartridge abuts the trailing end of the cartridge to be replaced, so that they are in nose to tail relationship.

As the piston 80 is displaced along the guide rods 74, the two cartridges travel in tandem axially of the sleeve 20 with the flange 34 of the leading cartridge seating on a shoulder or rebate 120 (see FIGS. 4, 5 and 6) of the trailing cartridge. Eventually, the trailing cartridge enters the sleeve 20 while the leading cartridge is pushed further into the cell. The leading cartridge will eventually be displaced out of the sleeve so, to prevent damage, it may be supported within the cell by means of the master-slave manipulator associated with the workstation at which the replacement operation is being carried out. During the replacement procedure, the containment conditions are maintained, ie at all times the throughbore is plugged against loss of containment environment and radiation shine-through by the leading cartridge and/or the trailing cartridge and sealing is maintained by the seals which are spaced with sufficient closeness to the cartridge ends that between adjacent seals on the leading and trailing cartridges the spacing is exceeded by the length of the throughbore. Thus during the replacement procedure a seal is at all times maintained by at least two of the O-ring seals 32, whether they be on one or other or both of the cartridges.

As the piston 80 travels along the rods 74, it eventually reaches a position where the locating member 102 encounters the stop 84. The locating member is therefore arrested and, as the piston continues to move forward, it is caused to be retracted into the recess 100 so that when the main body 98 of the piston engages, and is arrested by, the stops 84, the member 102 is fully depressed and is disengaged from the slots 36, 38 of the cartridge. At this point, further operation of the handle assembly is ineffective since the piston is arrested. This condition corresponds to the fully installed position of the replacement cartridge and the arrangement is such that the keeper 50 of the cartridge is now aligned both axially and angularly with the latch pin 68 when the later is allowed to move into its latching position.

To complete the procedure, the tool is reverse rotated to the position shown in FIG. 9 without, it will be noted, rotating the cartridge since the latter is now disengaged from the locating member 102. The cam 118 allows the latch to return and latch the replacement cartridge to the sleeve. The tool 72 may then be withdrawn and reloaded, after returning the piston 80 to its fully retracted position. The replaced cartridge will be located within the cell and may be posted out of the cell for disposal or re-use.

The internal constructions of the cartridges may vary considerably according to their particular functions. By way of example, that of FIG. 4 comprises an internal stepped bore 120 interconnecting the connectors 40, 42 and accommodating a shielding plug 122 provided with helically extending channels 124 (one only shown) providing fluid flow paths while protecting against radiation shine-through. The cartridge of FIG. 5 includes a number of insulated electrical conductors 130 (one only shown) providing electrical continuity between an in-cell electrical socket-type adaptor 40 and an out-of-cell plug-type electrical adaptor 42. To provide protection against shine-through, the conductors 130 are arranged to follow a meandering pathway through the cartridge, by means of an annular spacer 132 having conductor-receiving slots around its periphery, and are embedded within a suitable potting compound 134 filling the interior of the cartridge. In this example, the out-of-cell connector 42 is united with the cartridge by a length of the sheathed cable—it will be understood that prior to effecting replacement of this type of cartridge, the connector 42 will first of all be cut-off by severing the cable so that the cartridges can be brought into abutment without hindrance.

We claim:

1. A services connection assembly by which to effect sealed entry of service supplies, such as electrical, hydraulic, pneumatic and other supplies, to a controlled environment to be maintained isolated from its surroundings, the assembly comprising:

a. a unit having a throughbore elongated in the direction of entry and of constant cross section over its length, b. a cartridge having sealing means associated therewith disposed sealingly but slidably in the throughbore and having connectors at opposite ends for coupling with services supply lines, c. releasable means for fixing the position of the cartridge in the throughbore, and, d. a cartridge replacement means detachably engageable with the unit externally of the controlled environment for feeding forwardly relative to itself, whilst so engaged, a replacement cartridge which by abutment, nose to tail, with the cartridge already in position in the throughbore displaces the latter out of the throughbore into the controlled environment, when the releasable means has been released, whilst at all times in the course of the replacement operation maintaining sealing of the throughbore and thereby preventing any loss therethrough of the isolation of the controlled environment from its surroundings.

2. An assembly as claimed in claim 1 in which the throughbore has a length exceeding the maximum dimension of the cross-sectional area thereof and plural discrete sealing means carried by each cartridge for maintaining the isolation of the controlled environment from its surroundings are located close to each end of the cartridge with a spacing between them less than that length, the closeness to each end being sufficient for that length to exceed also the spacing between the sealing means which are adjacent one another on cartridges in nose to tail relationship.

3. An assembly as claimed in claim 1 in which the releasable means for fixing the position of the cartridge in the throughbore is a latching means and the cartridge replacement means is a manually operable tool which, when engaged with the unit, is operable to release the latching means in readiness for displacement of the cartridge to be replaced.

4. An assembly as claimed in claim 3, in which the tool is engageable with the unit via interfitting elements which are brought into and out of registry by rotation of the tool relative to the unit.

5. An assembly as claimed in claim 4 in which the latching means is released by rotation of the tool in a direction which brings the interfitting elements into registry, and in which the latching means is engaged by rotation of the tool to take the interfitting elements out of registry.

* * * * *